March 9, 1948.

T. F. BLUDWORTH 2,437,416

DEEP AND SHOAL ALARM

Filed Nov. 7, 1941

INVENTOR
Timothy Franklin Bludworth
BY Hastings W. Baker
ATTORNEY

March 9, 1948.  T. F. BLUDWORTH  2,437,416
DEEP AND SHOAL ALARM
Filed Nov. 7, 1941  2 Sheets-Sheet 2

INVENTOR
Timothy Franklin Bludworth
BY Hastings W. Baker
ATTORNEY

Patented Mar. 9, 1948

2,437,416

UNITED STATES PATENT OFFICE 2,437,416

DEEP AND SHOAL ALARM

Timothy Franklin Bludworth, Summit, N. J., assignor to National-Simplex-Bludworth, Inc., a corporation of Delaware Application November 7, 1941, Serial No. 418,135

11 Claims. (Cl. 177—311)

Depth finders, by which the depth of water may be ascertained, have heretofore been invented and are now in use. These depth finders operate on the principle of determining the depth by measuring the elapsed time between the sending of a signal, which travels to the bottom of the ocean and is reflected back to a receiver, and the receipt of the echo, and multiplying this elapsed time by the rate of travel of the sound or signal through the water. Such devices, however, are not limited to ascertaining the depth of the ocean, but may be employed to ascertain a lateral distance such as a distance to a submarine or other reflecting object.

The object of the present invention is to provide a deep and/or shoal alarm to be used in conjunction with a depth finder and adapted to give a signal, either audible and/or visual, when the ship carrying the same is in water of less than a certain depth and/or to give a signal, either visual and/or audible, when the ship is in water exceeding a certain depth. For instance, the master or the navigating officer may desire a signal to be given in case his vessel should pass into shoal water of less than fifty fathoms. One of the objects of the invention is to provide means whereby the officer could adjust the mechanism so as to give a signal whenever the vessel was in water of less than this depth, or the officer might desire for a signal to be given in case the vessel should sail into water exceeding some predetermined depth, such as sixty-five fathoms. One of the objects of the invention is to provide means whereby a signal will be given under the conditions recited.

Another object of the invention is to provide a shoal alarm which gives a continuous signal from the time the echo is received until the completion of a cycle of events and then will be rendered inoperative at the completion of a cycle of events.

Another object of the invention is to provide means to render the shoal alarm inoperative when the vessel is in water exceeding a predetermined depth.

Another object of the invention is to provide a deep alarm which will operate continuously from the time certain parts reach a position corresponding to a given depth until the end of a cycle of events, and means to prevent the operation of the deep alarm in case the vessel is in shoal water.

Another object of the invention is to provide a relay control circuit to render the deep alarm inoperative when the vessel is in shoal water and to render the shoal alarm inoperative when the vessel is in deep water.

Another object of the invention is the provision of control means to govern each of the alarms, the said control means being in turn controlled by the receipt of the echo.

Another object of the invention is to provide rotatable cam discs which control the operation of the relay circuits, forming a part of both the deep and the shoal alarm systems, and to provide adjustable contact means whereby the deep and shoal alarms may be adjusted to various depths as determined by the officer in charge.

Other objects and advantages of the invention will appear in the detailed specification and claims which follow.

The invention may be better understood by referring to the attached drawings in which Figure 1 is a side elevational view of one embodiment of the invention, and including the electric circuits therefor.

Figure 4:
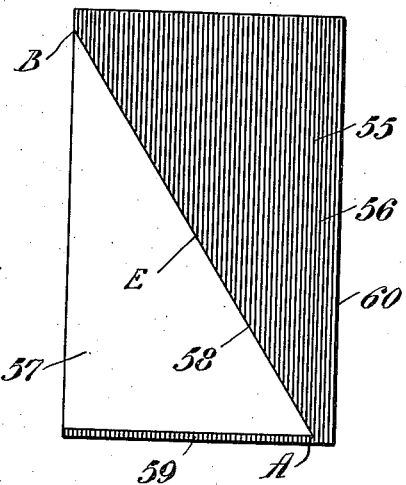
Figure 4 is a plan view of how the shutter would appear if it were cut longitudinally and unrolled into a flat sheet.
Figure 5:
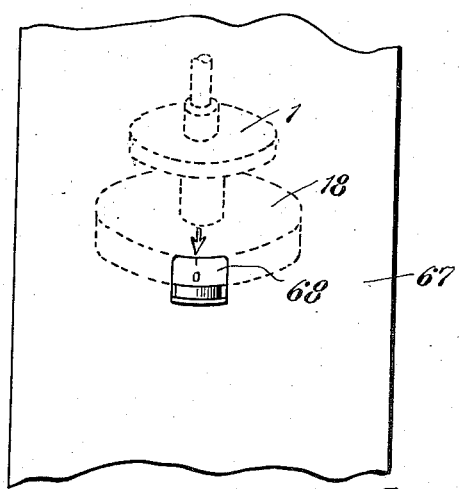
Figure 5 is a side elevational view of the index plate and showing in dotted lines a portion of the continuously rotating cam disk and the adjustable disc behind the plate.

Referring now in detail to the drawings, a support 47 is provided on which are mounted the motor M, brackets 48, 49, 50, 51 and 52. The motor M drives a pinion 53, which meshes with and drives a gear 54 secured to a shaft 46, the said shaft extending through the brackets 48, 49, 50 and 51, and at the upper end of the said shaft is secured the rotatable shutter 55. The construction of this shutter may be better understood by referring to Figure 4, showing a plan view thereof when unrolled. It will be noted that there is an opaque portion 56 and a translucent portion 57 with a diagonal division line 58 separating the opaque and the translucent portions. It will further be noted that the diagonal division line 58 is not a true diagonal, for it extends from the point A to the point B, and there is an opaque portion 59 at the extreme bottom. The point A is spaced slightly to the left of the vertical line 60, and the point B is spaced downwardly a short distance below the extreme top of the opaque portion. As will hereinafter be described, when the point A reaches the zero position of the slot 61, in the cylinder 62, the signal would be sent out.

When the shutter has almost completed its rotation, that is approximately the time that the vertical line 60 passes the vertical slot 61, the reset mechanism, hereinafter to be described, would be operated. It will, therefore, be apparent that as the shutter is continuously rotated, the signal will be sent out when the opaque portion thereof is behind the slot 61, that is just at the instant that the point A of the shutter reaches the zero point of the slot. The signal will then travel to the bottom of the ocean, and the echo will, by means hereinafter to be described, cause a neon tube 11 to be extinguished, and the observer can read on the indicia 63, while the light is burning, the position of the upper portion of the line 58 showing the then instantaneous depth of the ocean, the shutter rotating from left to right.

Secured to the shaft 46 are cam discs 1, 19 and 33 provided respectively with cams 64, 65 and 66. Adjustable contact carriers 18, 20 and 34 are adjustably supported on the brackets 50, 49 and 48 respectively. The adjustable contact carrier 18 is adapted to be manually adjusted on the bracket 50 and to be held by the said bracket in its adjusted position. This contact carrier 18 is usually adjusted only a few degrees to the right or left of zero. It may be used to correct known variables, such as the height of high tide or low tide or the squat of the ship, or to make allowance for the distance that the bottom of a ship is below the surface of the water. It is mounted behind an index plate 67 having a window 68 therein. When the zero appears at the center of the window 68, it means that no allowance is being made for the variables such as tide, etc., and when shifted to the right or left, it will indicate the number of feet or fathoms of the adjustment. This variable contact carrier 18 is provided with a contact carrying arm 69, which carries the reset contact arms 6 and 7, and the contact arms 3a, 2, 3b, 4 and 5, it being noted that the contact arms 6 and 7 are slightly to one side of the vertical plane through the remaining contact arms, so that as the cam 64 rotates in the direction of the arrow, or counterclockwise, the said cam 64 would first contact the reset contact arm 7 and shortly thereafter would contact the contact arm 2. As a matter of fact, the cam 64 reaches the reset contact arm 7 at the time the vertical line 60 passes the slot 61, and the cam 64 would reach the arm 2 when the shutter had been rotated, so that the point A would be at the zero point of the slot 61.

The sending of the initial signal will now be described. When the cam 64 on the disc 1 reaches the arm 2, it moves the said arm 2 upwardly out of contact with the arm 3a and into engagement with the arm 3b. On the left hand upper end of the arm 2 is an insulation plate 70, which, when the arm 2 is moved upwardly by the said cam 64, moves the contact arm 4 upwardly and simultaneously, making contact between the arm 4 and the arm 5. It will, of course, be understood that these are only momentary contacts while the cam 64 is elevating the contact arm 2. The contact between the contact arms 2 and 3b completes the circuit through the capacity 12c and through the transmitter 12 which projects a signal, either sonic or supersonic, towards the bottom or other surface. The instant that the cam 64 passes from beneath the arm 2, this circuit is broken. The function, therefore, of the circuit including the arms 2 and 3b is to send the signal at the moment the cam 64 reaches the arm 2, which is at the same instant that the point A of the shutter reaches the zero point of the slot 61. To switch arm 4 is applied a negative potential from the electric source 17. When the switch arm 4 is raised into contact with the switch arm 5, the circuit is completed to the relay winding 8, which attracts armature 8a, thereby establishing contact between the contact 9 and the armature 8a, and between the contact 10 and the armature 8a. Current can then pass from the source 17 through the armature 8a and contact 9 to the winding 8 after the momentary contact between 4 and 5 is broken, so that the armature 8a will continue to bridge the contact points 9 and 10. It will also be noted that a negative potential is applied to the contact 10, which completes the circuit through the neon lamp 11, so that the light shines through whatever translucent portion of the shutter which appears behind the slot 61. As this shutter continues its rotation, with the neon lamp burning, it appears that a rectilinear column of light rises upwardly from the zero point to the point at which it may be extinguished. The moment that the cam 64 on the disc 1 disengages the arm 2, contact is re-established and maintained between the contact arms 3a and 2, and negative potential is thereby supplied to the capacity 12c until the beginning of the next cycle, that is until the vertical line 60 reaches the slot 61.

When the signal is transmitted by the transmitter 12, the said signal travels to the bottom of the ocean or other reflecting surface, and is reflected back to the receiver 13. It is well known that such receivers, when actuated by the echo, cause the transmission of a weak electric impulse, which is amplified by the amplifier 14, and energizes the relay winding 15, thereby attracting the armatures 15a and 15b, that is, it moves the armature 15b into engagement with the contacts 16b and 16d, and moves the armature 15a into contact with the contacts 16a and 16c. The armature 15a thereby short circuits the relay winding 8, releasing the spring loaded armature 8a and opening the contacts between 8a and 9 and 8a and 10, thereby breaking the circuit to the neon lamp 11, so that it is extinguished. It will, therefore, be noted that the neon lamp is illuminated at the moment the signal is sent out, and is extinguished at the moment of the receipt of the echo.

I have now described the means by which the signal is transmitted and received, and how the depth of the ocean is visually indicated. If it is desired to make allowance for the fact that the receiver and transmitter may be positioned in the hull of the boat a known depth beneath the surface of the water, such an adjustment may be made by rotating the adjustable contact carrier 18 and thereby moving the position of the various contacts carried by the arm 69, so that the signal will be sent out at a time not exactly corresponding to the point when A would appear at the zero of the slot or window. This allows for any desired adjustment of this nature.

Just before the completion of the cycle, the cam 64 would contact the arm 7 and would raise it out of engagement with the arm 6. This would be only momentarily. It will be noted that the arm 6 is connected to the negative pole of the source of electric supply, and that the arm 7 is connected to the contact 30, contact arm 22, and other contacts, the function being to de-energize and reset the alarm system, as will hereinafter be described. This occurs while the shutter is rotating from the vertical line 60 to the position occupied by the point A.

Figure 1:
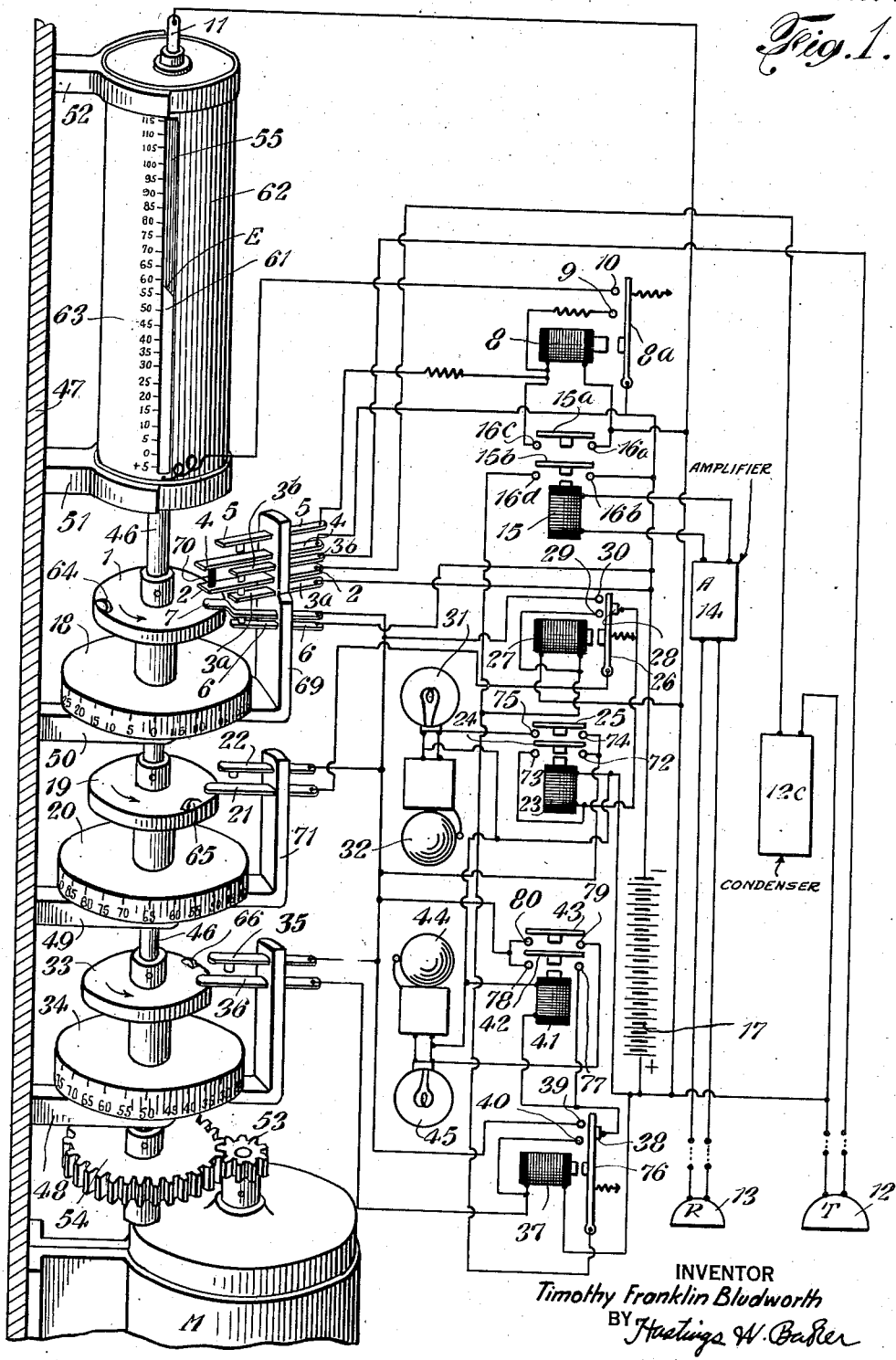
Figure 2:
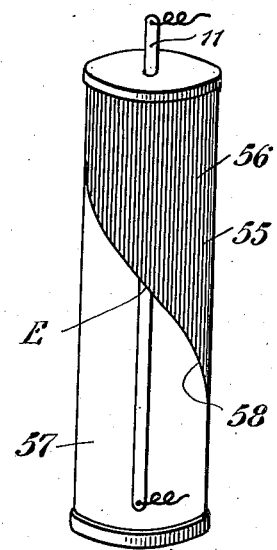
Figure 2 is a perspective elevational view of the rotatable drum type shutter.
Figure 3:
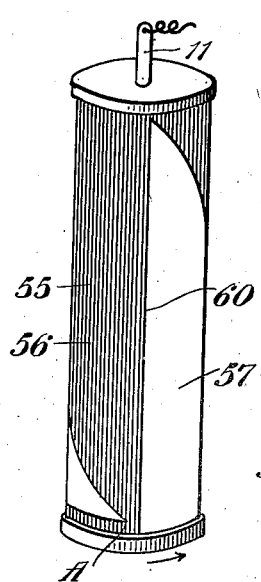
Figure 3 is a view similar to Figure 2, but showing the shutter when rotated to a different position from that shown in Figure 2.

In describing the deep and shoal alarm, the description may be simplified by using an illustration. As viewed in Figure 1, an indicated depth of a little less than sixty fathoms is noted. Let us call the upper portion of the line 58 visible in the window by the reference character E. Let us further assume that the navigating officer would like for a signal to be given if the ship should be in water of less than fifty fathoms. We will call this the shoal alarm. Let us further assume that he would like another indication to be given if the vessel were in water exceeding sixty-five fathoms. We will call this the deep alarm. This would be very similar to the semaphore arm as used on railways showing red for stop or great caution, yellow for caution and green for all clear. Just so in my proposed system the shoal alarm indicates great caution, the no alarm indicates caution and the deep alarm indicates there is no danger as to depth. Obviously, the navigating officer can adjust these figures to any figures he may desire, by correspondingly adjusting the adjustable contact carriers 20 and 34, but as above stated, it makes it simpler to understand if we assume that he has decided upon certain figures and has adjusted his adjustable contact carriers accordingly. I have, therefore, shown the shoal alarm contact carrier 34 as adjusted to fifty fathoms, and the deep alarm contact carrier as adjusted to sixty-five fathoms, it being understood that these figures would appear behind the windows like the window 68 in the index plate 67.

The deep alarm will now be described. The deep alarm may be described as an arrangement of cam operated and relay operated contacts which control the flow of electric current through relays, lamps, bells, buzzers, or other circuit closing or alarm devices. While I have shown a solenoid type relay, it is of course understood that any other type of suitable relay might be employed. In substance, the electrical circuits are so designed that a deep alarm will be set off and maintained continuously when the vessel is in deep water and from the time certain parts reach a position corresponding to a given depth until the time of the resetting of the circuit, the said circuit being reset immediately prior to the zero point of the indicator or the beginning of a new cycle. The adjustable contact carrier 20 has been set to indicate sixty-five fathoms, and this carrier carries a contact carrying arm 71, which arm carries contacts 21 and 22, the contact 21 being positioned below the contact arm 22 and in the path of movement of the cam 65 on the disc 19 which, it will be remembered, rotates with the shaft 46. When the cam 65 contacts the arm 21, it raises it into contact with the arm 22. If the depth measurement exceeds sixty-five fathoms, the cam 65 will have passed the arm 21 before the armature 15b closes the contacts 16b and 16d, and the deep alarm will be sounded, but if the depth is less than sixty-five fathoms, the cam 65 will not have closed the contact arms 21 and 22 when the echo is received, and the deep alarm will not be sounded. In other words, the deep alarm will be actuated if the indicated depth is more than sixty-five fathoms, but will not be actuated if it is less than sixty-five fathoms. It will be noted that the illustrated adjustment of the deep alarm is sixty-five fathoms. Referring to the case just stated, the echo signal has arrived when the indicator shows sixty fathoms, and it has extinguished the light source 11. When the echo was received, the relay winding 15 was energized, as above described, and the armature 15b bridged the contacts 16b and 16d so that the negative terminal of the source of electric current 17 was connected through the contact 16b, armature 15b, and contact 16d, thereby applying negative potential to the relay winding 27, thereby attracting the armature 26 and closing contacts 29 and 30. Of course, the armature 15b is attracted only momentarily at the moment of the echo, and it is necessary to provide means to maintain the armature 26 in position to close the contacts 29 and 30 after the armature 15b moves away from the contacts 16b and 16d, and this is done through the circuit, including the arms 6 and 7. The contact arm 6 is in circuit with a negative pole of the source of electric supply, and the contact arm 7 is in engagement with the arm 6, which is in circuit with the contact 30, from which a negative potential passes through the armature 26, contact 29, and to the winding 27, thereby maintaining the winding 27 energized until the reset contact arm 7 is raised by the cam 64. When the armature 26 is bridging the contacts 29 and 30, it has broken the circuit through the contact 28, thereby inhibiting relay winding 23, so that when cam 65 moves the contact arm 21 into engagement with the contact arm 22, the relay 23 does not operate.

However, the deep alarm will operate if the measured depth had exceeded sixty-five fathoms, and in such a case its operation would be as follows: If the water exceeded sixty-five fathoms, the cam 65 would have passed the contact arm 21 before the echo was received, and the closing of contact arms 21 and 22 will energize relay winding 23 through armature 26 and contact 28. In that case the contacts 21 and 22 would have been closed prior to the movement of the armature 15b into contact with the contacts 16b and 16d, so that the coil 27 would not be energized, and the negative potential would pass from the negative pole of the battery 17 through the contact arm 6 and contact arm 7, and to the contact arm 22 and contact arm 21, and thence through the armature 26 to contact 28 and winding 23, thereby pulling downwardly the double armature 24, 25. The armature 24 will then bridge contacts 72 and 73 while the armature 25 will bridge contacts 74 and 75. However, the moment that the cam 65 passes beyond the contact arm 21 the circuit will be broken and it is necessary to maintain current through the winding 23 until the end of the cycle, so that the deep alarm will continue to sound. The contacts 72 and 74 are directly connected to the contact arm 7, so that these contacts have a negative potential. When the armatures 25 and 24 have been moved downwardly into engagement with the contacts 75 and 74, and 73 and 72 respectively, the light 31 and the bell 32 will be energized and current will pass from the contact 72 through the armature 24 to contact 73, and to the winding 23 thereby maintaining the armatures in closed position until the end of the cycle, at which time the arm 7 is raised out of contact with the arm 6, and that circuit is broken, so that the deep alarms 31 and 32 will thereby (1) not be excited if we are in shoal water, this being prevented by the armature 26 being moved out of engagement with the contact 28 and (2) will be excited if the ship is in deep water, and will continue to be excited from the time the contacts 21 and 22 are closed until the arm 7 is moved out of engagement with the arm 6 at or near the end of the cycle. The armature 26, therefore, serves as a means to inhibit the operation of the deep alarm when the vessel is in shoal water, and serves as a part of the circuit to the deep alarm in case the vessel is in deep water.

The shoal alarm will now be described. The drawing shows the adjusted shoal alarm set at fifty feet. Suppose the indicated depth is some value less than fifty feet. The echo received by the receiver 13 will energize the relay winding coil 15 through the receiver amplifier 14, thereby closing the armature 15b to contacts 16b and 16d, so that a negative potential passes to the armature 76 and to the contact 38, which is in circuit with the relay winding 41, thereby attracting the armatures 42 and 43, so that the armature 42 bridges the contacts 77 and 78, and the armature 43 bridges the contacts 79 and 80. However, the current will flow through the armature 15b only momentarily, so that armatures 42 and 43 will be moved into contact with the said contacts 78 and 77, and 79 and 80 respectively, only momentarily insofar as the circuit through the armature 15b is concerned, but it is necessary to maintain the winding 41 energized. However, the moment that the armatures 42 and 43 are moved into engagement with their respective contacts, the negative potential on the arms 6 and 7 will be transmitted to the contacts 78 and 80. From the contact 78 this negative potential will pass through the armature 42 to the contact 77, and thence to the winding 41, maintaining it energized while the negative potential from the contact 80 will pass through the armature 43 to the contact 79, and thence to the shoal lamp 45 and shoal bell 44, so that the light will be illuminated, and the bell rung as long as the said circuit remains closed. However, this circuit will be broken when the cam 64 raises the arm 7 out of engagement with the arm 6, which is at the end of the cycle.

Conversely, suppose the indicated depth is greater than fifty feet. In that case, the shoal alarm should not operate. In such a case, the cam 66 on the cam disc 33 will have passed the arm 36 and raised it into engagement with the arm 35, prior to the receipt of the echo, thereby energizing the relay coil 37, the circuit being completed from the negative pole of the source of electric current through the arms 6 and 7, and through the arms 35 and 36. When the coil 37 is energized, it attracts the armature 76 to the contacts 39 and 40, and away from the contact 38. The circuit through the contacts 35 and 36 is of course immediately thereafter broken, but the moment the armature was moved into engagement with the contacts 39 and 40, a circuit was closed from the source of negative potential through the arms 6 and 7 to contact 39, and through the armature 76 to contact 40 connected to the winding 37, so that the solenoid winding 37 is maintained energized, and the circuit through the contact 38 is opened. If now the signal should return with the circuit through the contact 38 broken, the coil 41 would not be energized, and there would be no closed circuit to the shoal alarm, and it would, therefore, remain inoperative.

At or near the end of the cycle of operation or one complete rotation of the shutter, the arm 7 is raised out of engagement with the arm 6, and all connection to the relays 27, 23, 41 and 37 are broken, so that the entire mechanism is thereby reset and is ready for a new cycle of operation, a cycle of operation being one complete rotation of the shutter. However, the invention is not limited to a rotating shutter, for the invention may be applied to any type of depth finder. A more accurate definition of cycle would, therefore, be the events which occur between the sending out of successive signals.

It is realized that many changes may be made in the specific form of the invention shown by way of illustration herein, and I, therefore, desire to claim the same broadly, except as I may limit myself in the appended claims.

Having now described my invention, I claim:

1. In a depth finder, a lamp, a signal transmitter and a receiver adapted to receive the echo from the transmitter, circuits for said lamp, transmitter and receiver, a constantly rotating cam means, contacts actuated by said cam means on the zero point of its rotation to close the circuit to the transmitter and the circuit to the lamp, means to maintain the lamp circuit closed until the echo is received, means to open the lamp circuit when the echo is received, a deep alarm, means to operate the deep alarm when the depth exceeds a predetermined value, and to prevent its operation when the depth is less than said predetermined value, said last named means including a relay, means whreeby the relay when operated continues to be operated until reset, and means controlled by said cam means to reset the relay when the cam means has almost completed its revolution.

2. In a depth finder in which signals are sent out by a transmitter and the echo is received by a receiver, the interval between two successive signals being one cycle, a deep alarm, a relay controlled by the echo at the moment the echo is received, a circuit closed by the momentary actuation by the echo of the relay, said circuit including the windings of the relay and thereby maintaining the relay actuated, a constantly moving cam which passes through its zero position at the moment the signal is transmitted, contacts adapted to be closed by said cam when the cam has rotated to a point representing a given depth, means to actuate the alarm if the said contacts close prior to the actuation of the relay and to prevent the actuation of the alarm if the contacts close after the actuation of the relay.

3. In a depth finder in which signals are sent out by a transmitter and the echo is received by a receiver, the interval between two successive signals being one cycle, a deep alarm, a relay controlled by the echo at the moment the echo is received, a circuit closed by the momentary actuation by the echo of the relay, said circuit including the windings of the relay and thereby maintaining the relay actuated, a constantly moving cam which passes through its zero position at the moment the signal is transmitted, contacts adapted to be closed by said cam when the cam has rotated to a point representing a given depth, means to actuate the alarm if the said contacts close prior to the actuation of the relay and to prevent the actuation of the alarm if the contacts close after the actuation of the relay, and means to reset the relay at the end of the cycle.

4. In a depth finder in which signals are sent out by a transmitter and the echo is received by a receiver, the interval between two successive signals being one cycle, a deep alarm, a solenoid, an armature therefor, a circuit to said solenoid, means whereby said circuit is closed upon the receipt of an echo, a second circuit to said solenoid, said armature serving as a means to close said second circuit when the solenoid is actuated by the said current in the first circuit, a constantly moving cam which passes through its zero position at the moment the signal is transmitted, contacts adapted to be closed by said cam when the cam has rotated to a point representing a given depth, means including said armature to actuate the alarm if the said contacts close prior to the actuation of the armature of the first circuit and to prevent the acuation of the alarm if the contacts close after the actuation of the armature.

5. In an interval meter of the type adapted to be actuated by the sending of a signal and the receipt of its echo, an alarm, a first relay and circuit therefor, cam controlled means actuated in timed relation with the sending of the signal to actuate the relay at the end of a definite period of time after the signal is sent, a second relay and circuit therefor, means to control the second relay by the receipt of the echo, a circuit to said alarm controlled by said second relay, the armature of the first relay serving as a means to close the circuit for the second relay when the first relay is not actuated, and to break the circuit to the second relay when the first relay is actuated.

6. In an interval meter of the type adapted to be actuated by the sending of a signal and the receipt of the echo, an alarm, a first relay and circuit therefor, cam controlled means actuated in timed relation with the sending of the signal to actuate the relay at the end of a definite period of time after the signal is sent, a second relay and circuit therefor, means to control the second relay by the receipt of the echo, a circuit to said alarm controlled by said second relay, the armature of the first relay serving as a means to close the circuit for the second relay when the first relay is not actuated, and to break the circuit to the second relay when the first relay is actuated, and means to maintain the first relay in its actuated condition from the time of its actuation to the end of a predetermined period of time.

7. In a time interval meter acting on the echo principle, a first relay, cam controlled means actuated in timed relation with the sending of the signal whereby the said first relay is actuated at the end of a definite period of time after the signal is sent and is thereafter maintained actuated until reset, an alarm, a circuit to said alarm, a second relay to control said alarm circuit, a circuit to said second relay, means whereby the circuit to said second relay is closed when the echo is received prior to the actuation of the first relay, and is opened when the echo is received after the actuation of the first relay.

8. In a time interval meter acting on the echo principle, means to send out a signal, a first relay, means whereby the said first relay is actuated at the end of a predetermined time interval after the signal is sent and is thereafter maintained actuated until reset, an alarm, a circuit to said alarm, a second relay to control said alarm circuit, a circuit to said second relay, means whereby the circuit to said second relay is closed when the echo is received prior to the actuation of the first relay, and is opened when the echo is received after the actuation of the first relay, and means whereby the second relay maintains the alarm circuit closed after the second relay is actuated until reset.

9. In a time interval meter acting on the echo principle, means to send out a signal, a first relay, means whereby the said first relay is actuated at the end of a predetermined time interval after the signal is sent and is thereafter maintained actuated until reset, an alarm, a circuit to said alarm, a second relay to control said alarm circuit, a circuit to said second relay, means whereby the circuit to said second relay is closed when the echo is received prior to the actuation of the first relay, and is opened when the echo is received after the actuation of the first relay, means whereby the second relay maintains the alarm circuit closed after the second relay is actuated until reset, and means to reset both of said relays after the end of a predetermined time interval.

10. In a depth finder in which signals are sent out by a transmitter and the echo is received by a receiver, the interval between two successive signals being one cycle, a deep alarm, a relay circuit adapted to be set for a predetermined depth, means controlled by the relay circuit to cause the alarm to be actuated when no echo has been received during a time interval corresponding to said predetermined depth, means whereby the alarm when operated continues to be operated until the relay circuit is reset and means to reset the relay circuit near the expiration of the cycle.

11. In a depth finder in which signals are sent out by a transmitter and the echo is received by a receiver, the interval between two successive signals being one cycle, a deep alarm, a relay circuit adapted to be set for a predetermined depth, means controlled by the relay circuit to cause the alarm to be actuated when no echo has been received during a time interval corresponding to said predetermined depth, means whereby the alarm when operated continues to be operated until the relay circuit is reset, means to inhibit the operation of the alarm when the echo is received from a depth less than the predetermined depth, and means to reset the relay circuit near the expiration of the cycle.

TIMOTHY FRANKLIN BLUDWORTH.

REFERENCES CITED

The following references are of record in the file of this patent:

UNITED STATES PATENTS

| Number | Name | Date |
|---|---|---|
| 160,400 | Dixwell | Mar. 2, 1875 |
| 1,007,178 | Billings | Oct. 31, 1911 |
| 1,547,909 | Earle | July 28, 1925 |
| 1,729,595 | Hayes | Sept. 24, 1929 |
| 1,853,119 | Fessenden | Apr. 12, 1932 |
| 1,885,652 | Touly | Nov. 1, 1932 |
| 1,968,078 | Hershey | July 31, 1934 |
| 2,007,371 | Hopkins et al. | July 9, 1935 |
| 2,009,459 | Turner | July 30, 1935 |
| 2,012,837 | Tear | Aug. 27, 1935 |
| 2,098,266 | Walker | Nov. 7, 1937 |

FOREIGN PATENTS

| Number | Country | Date |
|---|---|---|
| 684,321 | Germany | Nov. 25, 1939 |